United States Patent [19]

Stevison et al.

[11] Patent Number: 5,344,660
[45] Date of Patent: Sep. 6, 1994

[54] BONE-IN MEAT PRODUCT

[75] Inventors: Michael F. Stevison, Gallatin; Dave Stevison, Portland; John P. White, Gallatin, all of Tenn.

[73] Assignee: Stevison Ham Company, Portland, Tenn.

[21] Appl. No.: 95,167

[22] Filed: Jul. 20, 1993

Related U.S. Application Data

[62] Division of Ser. No. 22,014, Feb. 24, 1993.

[51] Int. Cl.⁵ ............................... A23L 1/31
[52] U.S. Cl. .................. 426/104; 426/105; 426/132; 426/135; 426/641
[58] Field of Search ............... 426/105, 129, 135, 138, 426/140, 143, 282, 284, 412, 413, 414, 420, 513, 641, 104, 132

[56] References Cited

U.S. PATENT DOCUMENTS

| | | |
|---|---|---|
| 2,789,908 | 4/1957 | Doepken . |
| 2,968,570 | 1/1961 | Pinta et al. . |
| 3,644,125 | 2/1972 | Lobiondo et al. . |
| 3,753,741 | 8/1973 | Stewart . |
| 3,911,154 | 10/1975 | Weatherspoon ............... 426/282 |
| 4,378,379 | 3/1983 | Ueshaus ......................... 426/272 |
| 4,921,714 | 5/1990 | Matthews et al. ........... 426/641 X |
| 4,948,610 | 8/1990 | Goglio ............................. 426/392 |

*Primary Examiner*—Arthur L. Corbin
*Attorney, Agent, or Firm*—Mark J. Patterson; Edward D. Languist, Jr.; I. C. Waddey, Jr.

[57] ABSTRACT

A bone-in ham steak is made by separating the muscle, fat, and femur bones from green hams and curing the muscle in a conventional manner. The femur bones are cut into linear segments and aligned lengthwise on a skewer and then placed in a casing. The aggregated and cured ham muscle and fat are tumbled and massaged to extract protein and placed into said casing so as to concentrically surround the bone segments. The product is then cooked and sliced into ham steaks of uniform size and weight with a central bone piece.

2 Claims, 3 Drawing Sheets

BONE-IN MEAT PRODUCT

This is a divisional application of U.S. patent application Ser. No. 022,014 filed Feb. 24, 1993 for "Bone-In Meat Product and Method of Making Same".

BACKGROUND OF THE INVENTION

The present invention relates generally to prepared meat products and more particularly to a steak product, typically made of ham, having a bone placed in the center of the steak, and also a method of manufacturing such a product.

Center-cut, bone-in ham steaks are a popular consumer food item and for that reason many restaurants have placed them on their menus. For reasons of economy, efficiency, and ease of preparation, restaurants prefer to purchase such ham steaks already prepared and sliced in controlled portions. A traditional way of preparing a bone-in ham steak is to cut out the center of a cured bone-in or semi-boneless ham and then slice it. The bone is left in the sliced steaks, to leave the natural appearance preferred by consumers. However, preparing a center cut, bone-in ham steak in this manner has several drawbacks.

First, a natural cut bone-in ham steak can weigh as much as sixteen ounces, which is too large for normal restaurant use, where six or eight ounce portions are preferred. A conventionally prepared eight ounce ham steak, however, must be cut so thin that it lacks an appealing appearance and is prone to fall apart prior to consumption. Further, if one chooses to simply cut the center portion of a ham from the butt and shank and then slice the steaks from that portion, it is difficult to closely control the size of the resulting portions because of the varying shapes of the hams. Also, the bone in such steaks will not be uniformly centered. In six or eight ounce portions, there may be an excess amount of fat which is naturally deposited in the center of the ham near the femur bone. Finally, a process which uses only the center portion of the ham means that the meat processor must waste the butt and the shank ends or find another use for them.

What is needed, then, is a ham steak product that can be manufactured in uniform six or eight ounce portions. This needed ham steak product must have a desirable appearance with a centered bone, minimal fat, and adequate thickness. This product is presently lacking in the prior art.

SUMMARY OF THE INVENTION

The bone-in ham steak of the present invention is manufactured by separating the femur bone from a green bone-in ham and then processing the ham muscle in a conventional manner as if to make, for example, a boneless canned ham product. The center segments of the femur bones are cut into shorter, more uniform lengths. A plurality of such segments are then skewered on a rod. The skewered bone segments are placed on top of the bottom or outside ham muscle, inside a fibrous casing. The remaining processed ham muscle is then injected into the casing. The cased combination of bone and ham muscle is then cooked and smoked, producing a uniformly shaped and sized ham product with a centered bone. It can then be sliced into bone-in ham steak portions of consistent thickness, weight, and appearance.

One object, then, of the present invention is to provide a ham steak with a uniformly centered bone.

A further object of the present invention is to manufacture a bone-in ham steak in closely controlled restaurant sized portions.

Still another object of the present invention is to provide a method of manufacturing a ham steak in which the center, shank, and butt portions of the ham can be used.

Yet another object of the present invention is to provide a method of manufacturing a bone-in ham steak in which the star fat near the femur bone can be trimmed out.

DESCRIPTION OF THE PREFERRED EMBODIMENT

Figure 1:
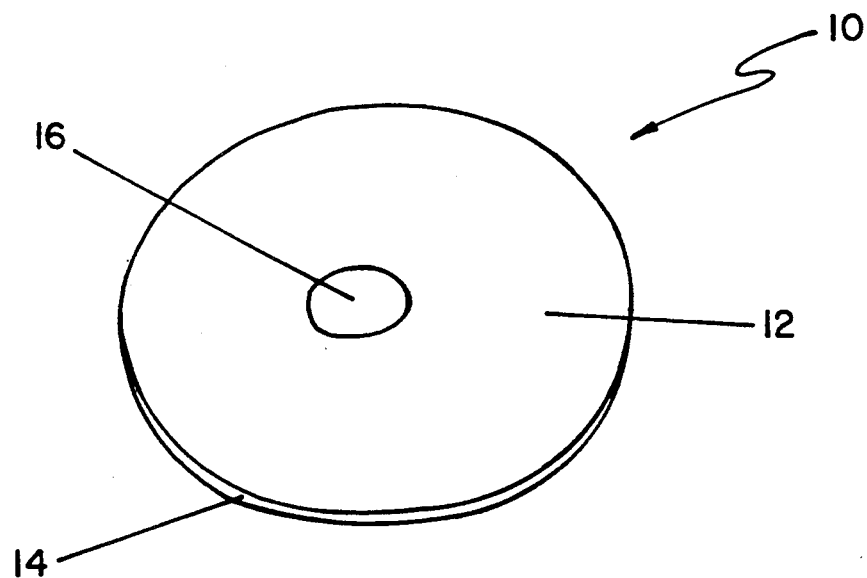
FIG. 1 is a plan view of the bone-in ham steak embodiment of the product of the present invention.

The bone-in meat product of the present invention is shown generally at 10 in FIG. 1. A substantially flat cylindrical meat or muscle section 12, which in this embodiment is made of an aggregation of muscle and fat from a whole ham, surrounds a bone piece 16, also having a generally cylindrical shape. A lower fat section 14, which is manufactured into the product 10 as described below, is included to give the ham steak a more natural appearance.

Figure 2:
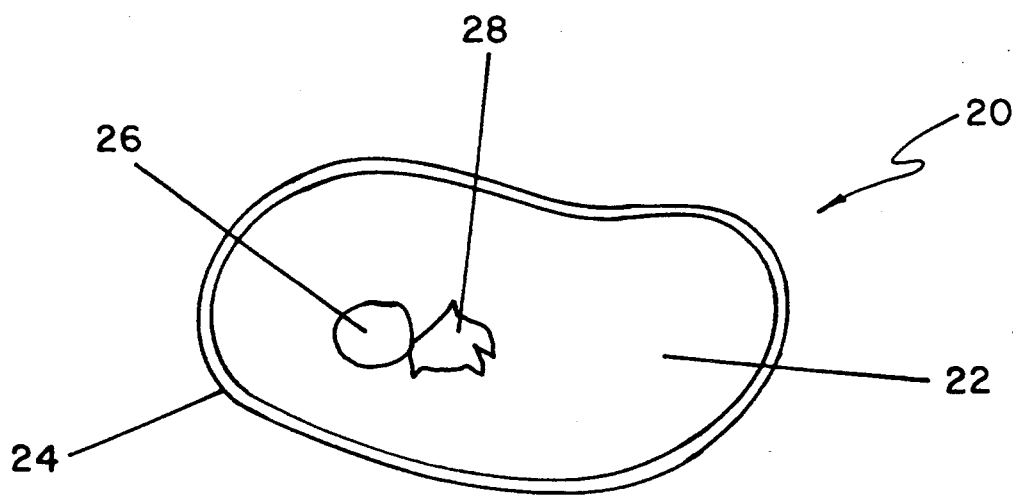
FIG. 2 is a plan view of a typical prior art natural bone-in, center cut ham steak.

As a matter of comparison, a bone-in ham steak naturally cut from the center portion of a ham is shown in FIG. 2. Muscle section 22 surrounds bone piece 26 (cut in situ from the femur bone naturally located within the whole ham). The location of bone piece 26 within ham steak 20 will vary substantially, depending upon the overall shape of the ham, and the location from within the ham that steak 20 is cut. A fat section 28, known in the art as "star fat", is usually disposed near the bone piece 26 in the center of muscle section 22, as part of the star fat which is naturally deposited by the hog. Around the peripheral margin of natural ham steak 20, and attached to muscle section 22, is fat layer 24, again a natural cover fat deposit from the animal.

Thus, in comparing FIGS. 1 and 2, the novel features of the ham steak product of the present invention can be identified. First, the amount of fat included in product 10 is substantially reduced because the method of manufacturing ham steak product 10, as described below, permits the trimming away of peripheral fat layer 24 as well as star fat layer 28 found naturally proximate to the femur bone. Second, bone piece 16 within product 10 can be more consistently centered because its location is not dependent on the natural variation in bone placement. Finally, although FIGS. 1 and 2 are not to scale, it will be recognized by those skilled in the art that product 10 can easily be manufactured in uniformly smaller portions, having a six or eight ounce pre-cooked weight, without having to trim the finished product, have the product undesirably thin, or with an off-center bone placement.

The manufacture of ham steak product 10 involves a sequence of conventional and novel steps in combination. The process starts with an uncooked (green) ham from which all the bones, including the femur bone, have been removed. The various muscles from the ham, including attached fat, are separated and trimmed in accordance with the specifications of the manufacturer or customer, with the largest, bottom muscle left intact. A conventional "cure" chemical is then injected into the separated muscle portions which aids in preserving the meat and in enhancing flavor. The muscles from the ham are macerated after the cure has been injected. This exposes a greater muscle surface area to allow for extraction of more protein. Extraction of protein, which is important for adhesion of the aggregated ham muscles, occurs during the next step, in which the injected muscles are tumbled and massaged, again in a conventional manner well known to those skilled in the art of ham processing.

Preferably, the boneless green hams used to begin the sequence of steps described above will weigh between twenty and twenty-six pounds. This weight range has been found to provide an optimal muscle and steak product yield. Other size hams can be used, however.

Figure 3:
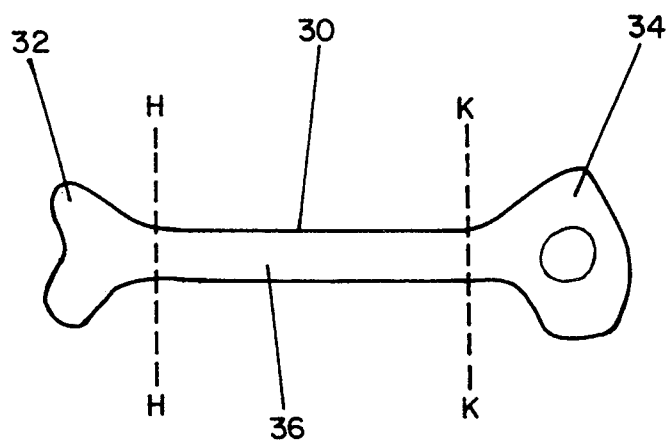
FIG. 3 is a side view of the femur bone used in the method of the present invention, before cutting.

To further continue the process, femur bones which have been removed from hams (also preferably in the range of twenty to twenty-six pounds), are collected for processing in a raw, untreated condition. A typical such femur bone 30 is shown in FIG. 3, having a hip end 32 and knee end 34 connecting a bone segment 36. Assuming that femur bones 30 are taken from relatively uniformly sized hams in the preferred weight range, they will have nominal lengths in the range of seven and one-half inches (7½") to eight and one-half inches (8½"), with a central diameter of one and one-eighth inches (1⅛") to one and three-fourth inches (1¾").

Although in the method of the present invention the femur bones 30 are used in their raw and untreated state, hip end 32 and knee end 34 must be cut and discarded along lines H and K as shown on FIG. 3. The respective cuts, which will define the length of bone segment 36, should be made at the point along bone segment 36 where the bone begins to flare towards its respective hip and knee ends. Again, using a femur bone 30 from a bone-in ham in the range of twenty to twenty-six pounds, a typical cut will be made approximately one and three-fourths inches (1¾") to two and one-quarter inches (2¼") from the distal end of hip end 32 and approximately two and one-fourth inches (2¼") to two and three-fourth inches (2¾") from the distal end of knee end 34 of bone 30. Consequently, bone segments 36, which are used in the method of the present invention as will be described, will have a nominal length ranging from three and one-fourth inches (3¼") to four and one-fourth inches (4¼").

Figure 4:
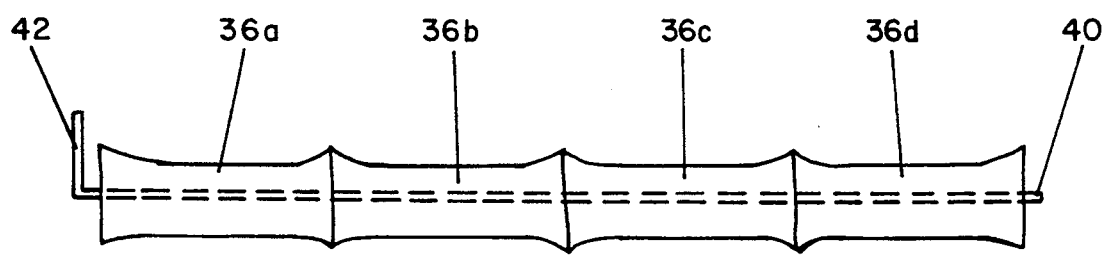
FIG. 4 is a side view of four femur bone segments on a skewer, as used in the method of the present invention.

After a plurality of bone segments 36 have been cut from a corresponding number of femur bones 30, they are placed end to end, through the centrally located marrow, on skewer 40 as shown in FIG. 4. Preferably, four bone segments 36a, 36b, 36c, and 36d will be placed on a single skewer 40. Skewer 40 has, at one end, an angled handle member 42 so that the linearly aligned bone segments 36 can be manipulated during the method as described.

Figure 5:
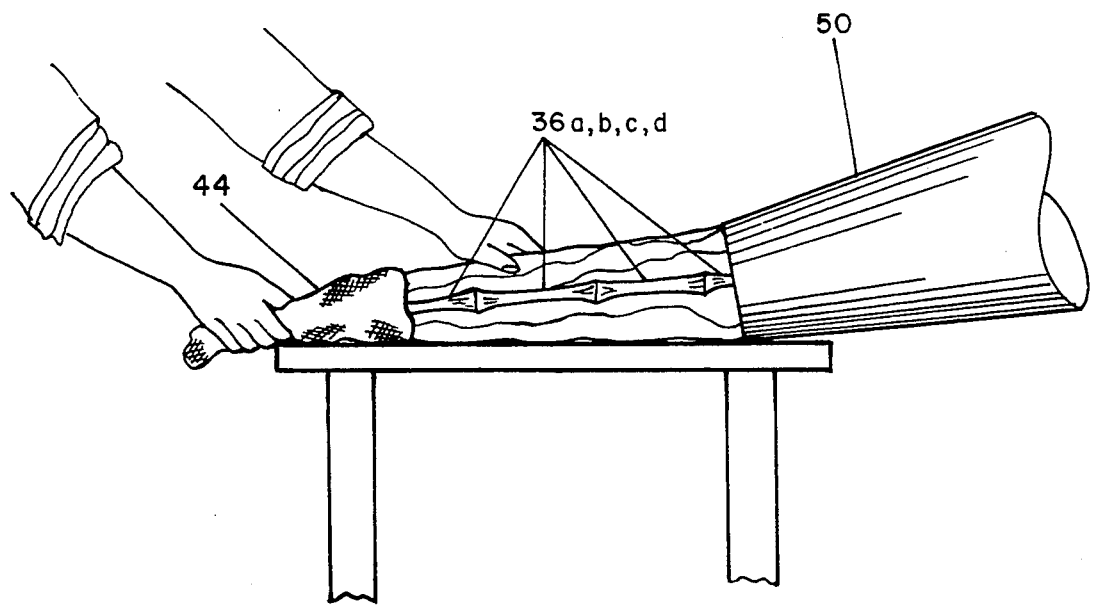
FIG. 5 is a side view of the fibrous casing, with skewered bone segments resting on a layer of the outside ham muscle, connected to the stuffing machine used in the method of the present invention.

As shown on FIG. 5, the skewered bone segments 36a–d are placed within a fibrous casing 44 on top of the bottom muscle portion of the ham (the largest muscle) which preferably will have been separated and processed with its natural fat cover. This permits the resulting ham steak product 10 to include a natural looking bottom fat border 14 as seen on FIG. 1. Casing 44 is preferably of a fibrous type well-known in the art or a stockinette can be used if preferred.

Casing 44, including a skewer 40 having multiple bone segments 36, is then attached to muscle injection machine 50 in a conventional manner. Injection machine 50, which can be a standard sausage stuffing machine for example, then causes the injection within casing 44 of an aggregation of additional ham muscle and fat which has been cured and massaged as described above. This injected muscle covers the previously placed bottom muscle and the skewer 40. Casing 44 is then drawn down tight against its contents using a draw cylinder, again in a conventional manner, and then clipped at its end in order to hold the constrained aggregated contents in a cylindrical shape. The muscle and fat aggregation can be hand stuffed as an alternative to machine stuffing.

Casing 44, which now is stuffed with a combination of pre-processed ham muscle and fat and the skewered and aligned bone segments 36a–d is then racked in an oven, cooked, and smoked, again in a conventional manner familiar to those in the art.

Figure 6:
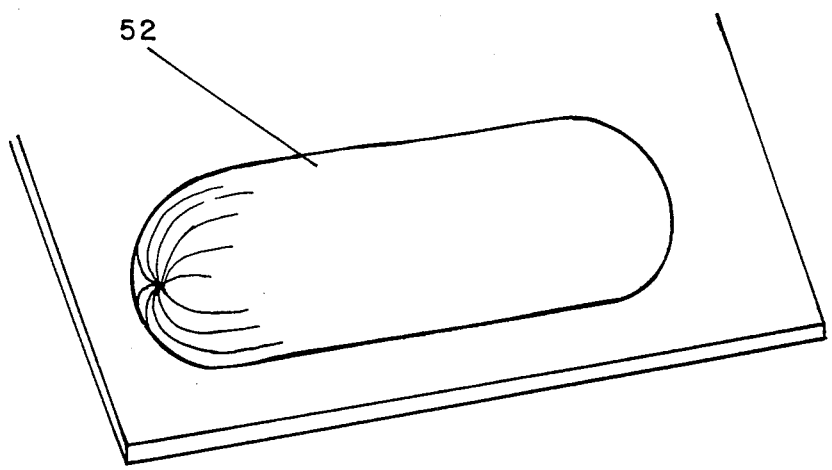
FIG. 6 is a perspective view of the cured and smoked bone-in ham product of the present invention, before slicing.

After the cooking and smoking step, and casing 44 is removed, a generally cylindrical shaped aggregation of ham muscle and fat bound together and surrounding the aligned bone segments 36 is produced, shown at 52 in FIG. 6. Skewer 40 has, at this point, been withdrawn from within the aligned plural bone segments 36a–d. Ham muscle cylinder 52 can then be sliced in a conventional manner, producing multiple ham steak products 10 having uniform shape, thickness, weight, and further including a generally centrally located bone piece 16, cut transversely from multiple bone segments 36a–d.

A primary problem identified in the process of making a bone-in meat product which includes removal and then reinsertion of the bone is maintaining adequate adhesion between bone piece 16 and meat section 12 so that it will maintain its appealing appearance during preparation and when served to a customer. Experimentation conducted by applicant has determined that maximum adhesion in the preferred ham steak embodiment is achieved by using femur bones 30 which are in their raw state and have not been treated by any chemical or mechanical means. In fact, adhesion of bone piece 16 to meat section 12 improves after the product 10 has been heated on the grill.

After processing as described in the steps above, a typical finished muscle and fat aggregation cylinder 52 will weigh approximately twelve and one-half (12.5) pounds. If six ounce steak portions are desired, the nominal length of cylinder 52 will typically be between 13.5 and 15 inches, with a diameter of approximately five to six inches. The sliced steak products 10 will then have a nominal thickness of approximately 0.40 to 0.44 inches.

Although the embodiment of the invention described herein is directed specifically at a bone-in ham steak, it can also be readily adapted for use with other muscle, fat, and bone butchered from a different part of a hog, or from beef cattle and other animals known for providing consumer meat products.

Thus, although there have been described particular embodiments of the present invention of a new and useful bone-in meat product and method of making same, it is not intended that such references be construed as limitations upon the scope of this invention except as set forth in the following claims. Further, although there have been described certain dimensions and other parameters used in the preferred embodiment, it is not intended that such dimensions be construed as limitations upon the scope of this invention except as set forth in the following claims.

What is claimed is:

1. A bone-in ham steak made by a method of making a bone-in ham steak comprising the steps of:
   a. separating muscle and fat from a green ham;
   b. tumbing and massaging said muscle and fat to form an aggregation of cured muscle and fat from which protein has been extracted;
   c. cutting the knee and hip ends from the femur bone of a ham, leaving a bone segment;
   d. aligning a plurality of bone segments lengthwise along a skewer, thereby forming a linear bone section.
   e. placing in a casing said linear bone section;
   f. stuffing said aggregation of cured muscle and fat into said casing around said bone section;
   g. drawing said casing to form an approximately cylindrical shaped meat product having a uniform diameter throughout its length with said bone section disposed longitudinally along the approximate center of said shaped meat product;
   h. cooking said shaped meat product; and
   i. slicing said cooked meat product transversely into a plurality of bone-in ham steaks having a uniform size, shape and weight.

2. A bone-in ham steak made by a method of making a bone-in ham steak comprising the steps of:
   a. separating muscle and fat from a green ham;
   b. tumbling and massaging said muscle and fat to form an aggregation of cured muscle and fat from which protein has been extracted;
   c. cutting the knee and hip ends from the femur bone of a ham, leaving a bone segment;
   d. aligning a plurality of bone segments lengthwise along a skewer, thereby forming a linear bone section.
   e. placing in a casing said linear bone section wherein said linear bone section is placed in said casing on top of a portion of bottom muscle from said ham, said bottom muscle having been processed with its fat cover intact;
   f. stuffing said aggregation of cured muscle and fat into said casing around said bone section;
   g. drawing said casing to form an approximately cylindrical shaped meat product having a uniform diameter throughout its length with said bone section disposed longitudinally along the approximate center of said shaped meat product;
   h. cooking said shaped meat product; and
   i. slicing said cooked meat product transversely into a plurality of bone-in ham steaks having a uniform size, shape and weight.

* * * * *